US012591357B2

(12) United States Patent
Van Den Broeck et al.

(10) Patent No.: US 12,591,357 B2
(45) Date of Patent: Mar. 31, 2026

(54) APPARATUS, METHODS AND COMPUTER PROGRAMS FOR PROVIDING CONTENT

(71) Applicant: Nokia Technologies Oy, Espoo (FI)

(72) Inventors: Marc Van Den Broeck, Sint-Katelijne-Waver (BE); Zoran Radivojevic, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 134 days.

(21) Appl. No.: 18/510,024

(22) Filed: Nov. 15, 2023

(65) Prior Publication Data

US 2024/0176465 A1     May 30, 2024

(30) Foreign Application Priority Data

Nov. 25, 2022     (EP) ..................................... 22209722

(51) Int. Cl.
| | |
|---|---|
| *G06F 3/0484* | (2022.01) |
| *G06F 3/01* | (2006.01) |
| *G06F 3/0488* | (2022.01) |
| *G06F 16/43* | (2019.01) |
| *G06F 3/16* | (2006.01) |

(52) U.S. Cl.
CPC ............ *G06F 3/0484* (2013.01); *G06F 3/017* (2013.01); *G06F 3/0488* (2013.01); *G06F 16/43* (2019.01); *G06F 3/012* (2013.01); *G06F 3/165* (2013.01); *G06F 3/167* (2013.01)

(58) Field of Classification Search
CPC ...... G06F 3/0484; G06F 3/017; G06F 3/0488;
G06F 16/43; G06F 3/012; G06F 3/165;
G06F 3/167; G06F 1/1626; G06F 1/163;
G06F 1/1698; H04M 1/72412; H04M
1/6091; H04M 1/724098
See application file for complete search history.

(56) References Cited

U.S. PATENT DOCUMENTS

2010/0097239 A1*  4/2010  Campbell ........... H04M 1/6083
455/466
2018/0254018 A1*  9/2018  Cherkashin ......... G06F 3/04162

FOREIGN PATENT DOCUMENTS

| | | |
|---|---|---|
| EP | 2654276 A1 | 10/2013 |
| WO | WO 2008/091727 A1 | 7/2008 |
| WO | WO 2009/073806 A2 | 6/2009 |

* cited by examiner

*Primary Examiner* — Phuong H Nguyen
(74) *Attorney, Agent, or Firm* — McCarter & English LLP

(57)     ABSTRACT

Examples of the disclosure relate to providing content from a console device to one or more user devices. In examples of the disclosure a console device can be configured to detect an activation input wherein the activation input includes physical contact with a user interface controlled by the apparatus, for example, the user interface of the console device. The console device can be configured to use wireless communication to query one or more user devices regarding providing content to the one or more user devices, based on the activation input and can be configured to collect one or more responses to the query. Content can then be provided via a wireless communication link to the one or more user devices based on the collected one or more responses.

13 Claims, 5 Drawing Sheets

APPARATUS, METHODS AND COMPUTER PROGRAMS FOR PROVIDING CONTENT

TECHNOLOGICAL FIELD

Examples of the disclosure relate to apparatus, methods and computer programs for providing content. Some relate to apparatus, methods and computer programs for providing content from a console device to one or more user devices.

BACKGROUND

Wireless communications can be used to connect groups of devices together. This can allow a single device such as a console device to serve multiple devices by providing content to the respective connected devices. Different content can be provided from the serving device to different connected devices.

BRIEF SUMMARY

According to various, but not necessarily all, examples of the disclosure, there may be provided an apparatus comprising means for:
detecting an activation input wherein the activation input comprises physical contact with a user interface controlled by the apparatus;
using wireless communication to query one or more user devices regarding providing content to the one or more user devices, based on the activation input;
collecting one or more responses to the query; and
enabling content to be provided via a wireless communication link to the one or more user devices based on the collected one or more responses.

The means may be for detecting a first type of response for user devices used by users positioned so that the user can touch the user interface controlled by the apparatus and detecting a second type of response from user devices used by users positioned so that the user cannot touch the user interface controlled by the apparatus.

The first type of response may comprise physical contact with the user interface controlled by the apparatus.

The second type of response may comprise a gesture input. The gesture input may comprise at least one of: a tap input, a voice input, movement of a user's head, movement of a user's hand.

Querying the one or more user devices may comprise transmitting a signal indicating a timing of the activation input.

The means may be for using the collected one or more responses to identify a user device associated with the activation input and wherein the content is provided to the user device associated with the activation input.

The content may comprise at least one of: audio content, visual content.

According to various, but not necessarily all, examples of the disclosure, there may be provided a console device comprising an apparatus as described herein.

According to various, but not necessarily all, examples of the disclosure, there may be provided a method comprising:
detecting an activation input wherein the activation input comprises physical contact with a user interface controlled by the apparatus;
using wireless communication to query one or more user devices regarding providing content to the one or more user devices, based on the activation input;
collecting one or more responses to the query; and enabling content to be provided via a wireless communication link to the one or more user devices based on the collected one or more responses.

According to various, but not necessarily all, examples of the disclosure, there may be provided a computer program comprising instructions which, when executed by an apparatus, cause the apparatus to perform at least:
detecting an activation input wherein the activation input comprises physical contact with a user interface controlled by the apparatus;
using wireless communication to query one or more user devices regarding providing content to the one or more user devices, based on the activation input;
collecting one or more responses to the query; and
enabling content to be provided via a wireless communication link to the one or more user devices based on the collected one or more responses.

According to various, but not necessarily all, examples of the disclosure, there may be provided an apparatus comprising means for:
receiving a query via wireless communication wherein the query is received from a console device and the query relates to providing content to one or more user devices, based on an activation input that has been detected by the console device; and
providing a response indicating whether the apparatus is associated with the activation input.

The means may be for enabling an output to be provided to a user wherein the output is indicative of the query.

The means may be for detecting a user input responding to the output indicative of the query, wherein the user input indicates if the user is associated with the activation input.

The means may be for detecting a first user input indicating that the user is associated with the activation input and a second user input indicating that the user is not associated with the activation input.

The user input may comprise a gesture user input.

According to various, but not necessarily all, examples of the disclosure, there may be provided a user device comprising an apparatus as described herein wherein the user device comprises at least one of; a head set, headphones, a mobile phone, a tablet device, a portable computer, a wearable electronics device.

According to various, but not necessarily all, examples of the disclosure, there may be provided a method comprising:
receiving a query via wireless communication wherein the query is received from a console device and the query relates to providing content to one or more user devices, based on an activation input that has been detected by the console device; and
providing a response indicating whether the apparatus is associated with the activation input.

According to various, but not necessarily all, examples of the disclosure, there may be provided a computer program comprising instructions which, when executed by an apparatus, cause the apparatus to perform at least:
receiving a query via wireless communication wherein the query is received from a console device and the query relates to providing content to one or more user devices, based on an activation input that has been detected by the console device; and
providing a response indicating whether the apparatus is associated with the activation input.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figure 1:
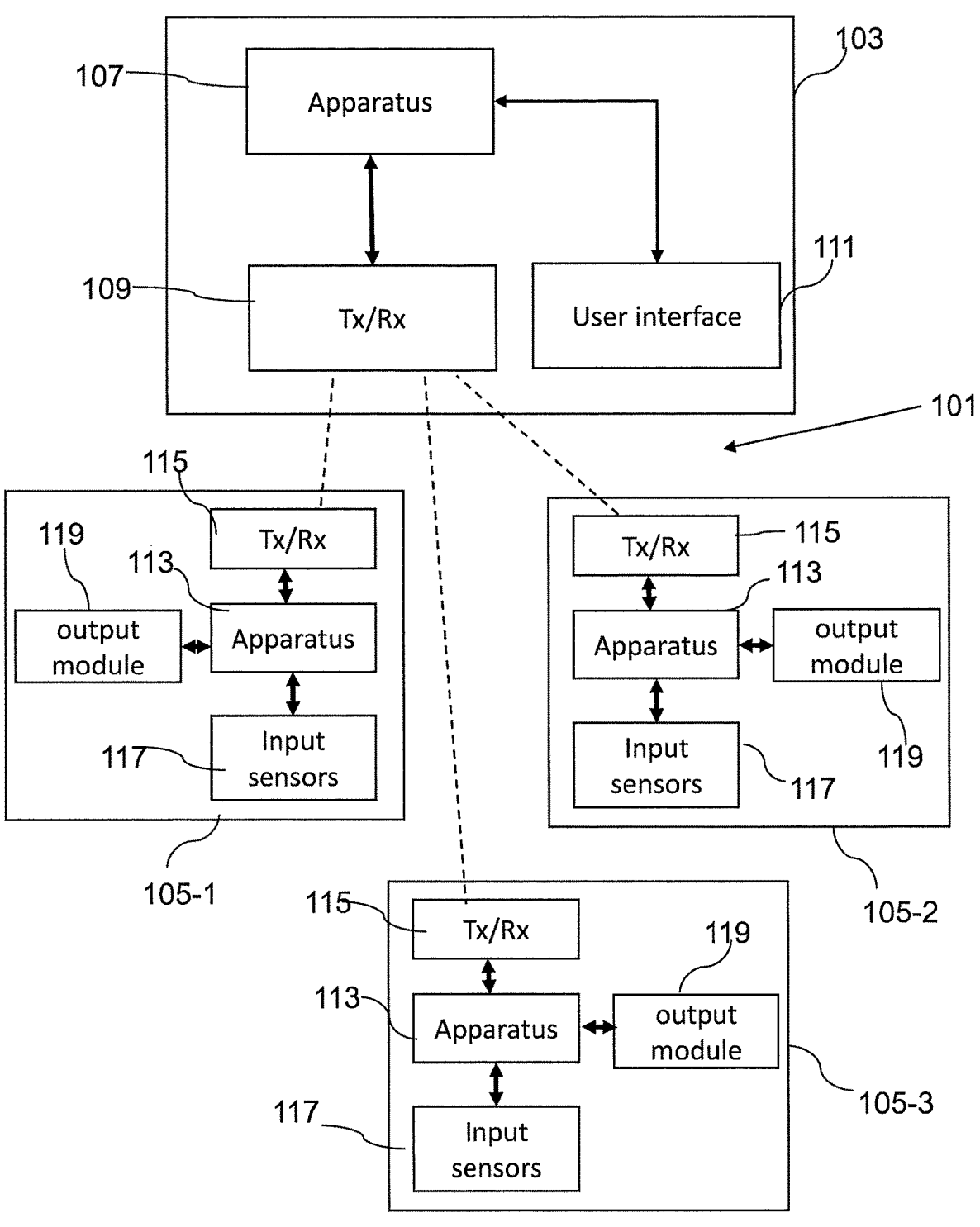
FIG. 1 shows an example system.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Corresponding reference numerals are used in the figures to designate corresponding features. For clarity, all reference numerals are not necessarily displayed in all figures.

DETAILED DESCRIPTION

FIG. 1 shows an example system 101 that can be used in examples of the disclosure. The system comprises a console device 103 and one or more user devices 105. The console device 103 can be configured to provide content to the one or more user devices 105. This can enable a single console device 103 to serve multiple user devices 105.

In the example of FIG. 1, the console device 103 comprises an apparatus 107, a user interface 111 and a transceiver 109. Only components that are referred to in the following description are shown in FIG. 1. Additional components could be provided in some examples of the disclosure.

Figure 5:
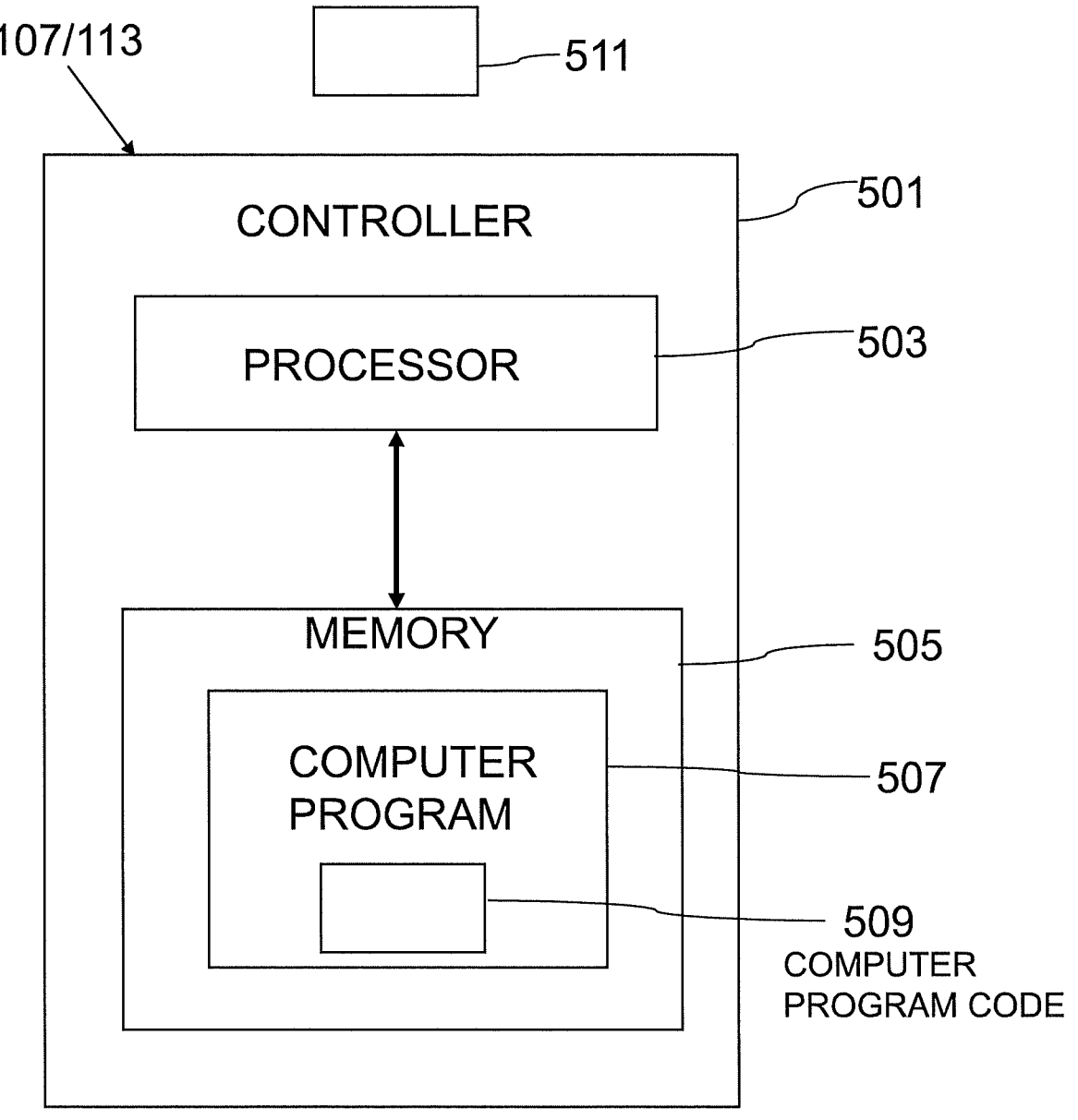
FIG. 5 shows an example apparatus.

The apparatus 107 can comprise a controller comprising a processor and memory. Examples of an apparatus 105 are shown in FIG. 5. The apparatus 107 can be configured to enable control of the console device 103. For example, the apparatus 107 can be configured to control the signals that are transmitted by the transceiver 109 of the console device 103. The apparatus 107 can also be configured to detect user input made via the user interface 111 and to perform appropriate functions in response to the detected user inputs. The apparatus 107 can also be configured to implement methods according to examples of the disclosure, such as the method of FIG. 2, or any other suitable method.

The transceiver 109 can comprise any means that enables the console device 103 to communicate with the user devices within the network 101. The transceiver 109 can enable wireless communications, or any other suitable type of communications, between the console device 103 and the user devices 105. The wireless communications could be implemented using low power wireless communications protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The user interface 111 can comprise any means than enables a user to make inputs to the console device 103. The user interface 111 could also comprise means that enables outputs to be provided to a user. For example, it could comprise means for displaying information.

In some examples the user interface 111 could comprise a touch screen. The touch screen can be configured so that a user can make inputs by physically contacting the touch screen or by making any other suitable type of input. This can enable a user who is close to the console device 103 to make inputs via the user interface 111.

The apparatus 105 can be configured to control the user interface 111. This can enable the apparatus 105 to detect inputs from the user interface 111. This can enable the apparatus 105 to be used to control any outputs provided by the user interface 111.

The example system 101 also comprises one or more user devices 105. In the example of FIG. 1, three user devices 105 are shown. Other numbers of user devices 105 could be in the system 101 in other examples.

The respective user devices 105 can be associated with respective users. In some examples the user devices 105 could be wearable user devices 105 such as headphones or a smart watch or other suitable device. In such cases a user device 105 can be associated with a user by being worn by a user and/or providing outputs to a user. In some examples the user devices could comprise a mobile phone or other similar device. In such cases the user device 105 can be associated with a user by belonging to a user or being used by the user.

In some examples a single user device 105 can be associated with a user. In other examples more than one user devices 105 could be associated with a user. For instance, both a mobile phone and headphones could be associated with the same user.

The respective user devices 105 comprise an apparatus 113, a transceiver 115, one or more input sensors 117 and an output module 119. Only components that are referred to in the following description are shown in FIG. 1. Additional components could be provided in some examples of the disclosure. In the example FIG. 1 all of the user devices 105 are shown as comprising an apparatus 113, a transceiver 115, one or more input sensors 117 and an output module 119. In some examples one or more of the user device 105 might not comprise each of these components. For instance, some user devices 105 might not comprise input sensors 117.

The apparatus 113 of the user device 105 can comprise a controller comprising a processor and memory. Examples of an apparatus 113 are shown in FIG. 5. The apparatus 113 can be configured to enable control of the user device 105. For example, the apparatus 113 can be configured to control the signals that are transmitted by the transceiver 115 of the user device 105. The apparatus 113 can also be configured to detect user inputs via the one or more input sensors 117 and to perform appropriate functions in response to the detected user inputs. The apparatus 113 can also be configured to outputs via the output module 119. The apparatus 113 can also be configured to implement methods according to examples of the disclosure, such as the method of FIG. 3, or any other suitable method.

The transceiver 115 can comprise any means that enables the user device 105 to communicate with other devices within the network 101. The transceiver 115 can enable wireless communications, or any other suitable type of communications, between the user device 105 and the console device 103 and/or any other suitable devices. The wireless communications could be implemented using low power wireless communications protocol such as Bluetooth, Bluetooth Low Energy, Bluetooth Smart, 6LoWPan (IP$_v$6 over low power personal area networks) ZigBee, ANT+, near field communication (NFC), Radio frequency identification (NFC), wireless local area network (wireless LAN) or any other suitable protocol.

The input sensors 117 can comprise any means that can be configured to detect user inputs made by a user of the user device 105. The types of sensors 117 that are used can depend on the type of user inputs that are to be detected.

In some examples the input sensors 117 can be configured to detect gesture inputs. The gesture inputs could comprise movement of the user or part of the user's body or the user tapping the user device 105 or some other surface. In such examples the sensors could comprise one or more inertial measurement units (IMU) or any other suitable types of sensors.

As an example, the user device 105 could comprise headphones comprising one or more IMUs. The IMUs could detect a user moving their head. For example, they could detect a user nodding or shaking their head or performing any other defined gesture. The IMUs could also be configured to detect tap inputs, the tap inputs could be made by a user tapping on the headphones themselves and/or tapping on any other nearby surface. Other types of inputs and user devices 105 could also be used.

In some examples input sensors 117 can be configured to detect voice inputs. For example, the voice inputs could comprise a user saying a command word or an appropriate instruction. In such examples the sensors 117 could comprise one or more microphones or any other suitable means for detecting an acoustic signal.

The input sensors 117 can be controlled by the apparatus 113 so that inputs detected by the input sensors 117 are provided as inputs to the apparatus 113.

The output module 119 can comprise any means that can be configured to provide an output of the user device 105. In some examples the output module 119 can be configured to provide content to a user of the user device 105. For instance, the output module 119 could comprise a loudspeaker or other means that can be configured to provide an acoustic output for the user. In some examples the output module 119 could comprise a display that can be configured to display information such as text or images. Other types of output modules 119 could be provided in some examples.

In the example of FIG. 1 the user devices 105 are shown comprising just one output module 119. In some examples the user devices 105 can comprise more than one output module 119. Different output modules can be configured to provide different outputs and/or functions.

The output module 119 can be controlled by the apparatus 113 so that outputs provided by the output module 119 are controlled by the apparatus 113.

The system 101 of FIG. 1 is configured so that the console device 103 can provide content to one or more of the user devices 105. The user devices 105 can be positioned close to the console device 103. The user devices 105 can be positioned close enough to the console device 103 to enable an appropriate wireless communication connection to be established.

In some examples the console device 103 could be provided within a vehicle that transports multiple users such as a car or train or airplane. In such cases the console device 103 can be configured to provide different content to different users. This could enable different users to listen to different audio content during their journey.

In some examples the console device 103 could be used in a public space in which there are multiple users such as in a shopping centre or in a service providing venue such as coffee shop or other suitable venue. In such cases the console device 103 could be configured to provide information to the user and/or to enable user to place orders or request services or make any other suitable functions.

In some use cases the users of one or more of the user devices 105 might be positioned close enough to the console device 103 so that they can interact with the user interface 111 of the console device 103. For instance, a user could be close enough to the console device 103 to physically touch a touch screen. In other cases a user might not be positioned close enough to the console device 103 so that they can interact with the user interface 111 of the console device 103. For instance, a user could be seated in the rear of a vehicle while the console 10 device 103 is located in the dashboard, or there could be a group of people around a console device 103 in a public venue that prevents the user 105 from getting within touching distance of the console device 103.

In the example of FIG. 1 two of the user devices 105-1, 105-2 are located close to the console device 103. The users of these two user devices 105-1, 105-2 might be able to interact directly with the user interface 111 of the console device 103. However, the third user device 105-3 is not located close to the console device 103. The user of the third user device 105-3 might not be able to interact directly with the user interface 111 of the console device 103.

Examples of the disclosure provide methods, devices and computer programs that enable users of the user devices 105 to control the content provided by the console device 103 even when they are not close enough to touch the console device 103.

Figure 2:
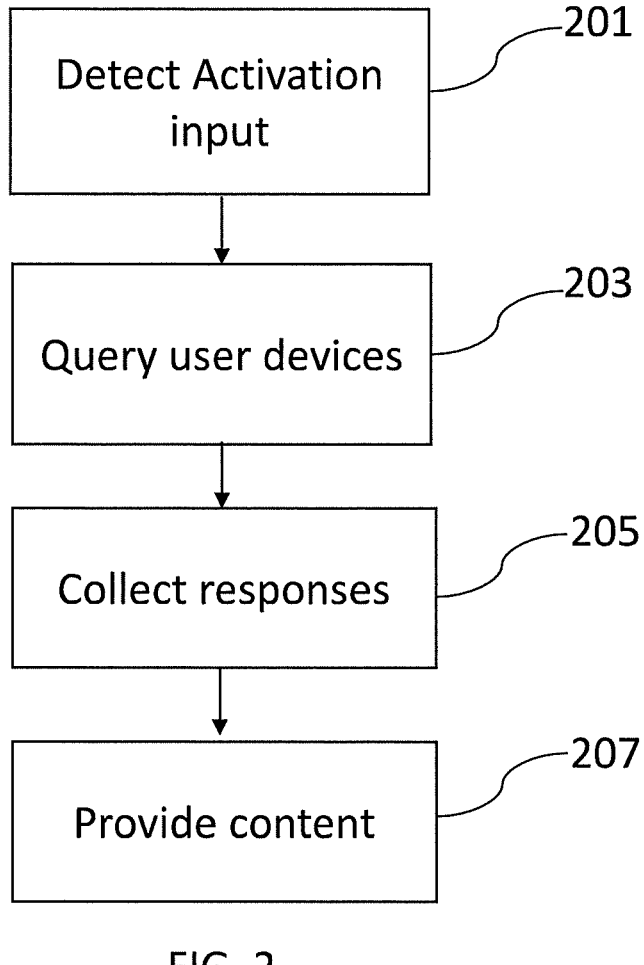
FIG. 2 shows an example method.

FIG. 2 shows an example method. The method could be implemented by an apparatus 107 of a console device 103 or by any other suitable apparatus or device.

The method comprises, at block 201, detecting an activation input. The activation input activates the console device 103 and causes the console device 103 to implement the method of FIG. 2.

The activation input can be made using the user interface 111 of the console device 103. In examples of the disclosure the activation input comprises physical contact with a user interface 111 of the console device 103. For example, the activation input can comprise a user touching or tapping a screen of the user interface 111 or making any other suitable type of user input.

The activation input can be made by any user who is close enough to touch the console device 103. In some scenarios the activation input can be made by a user who is wishing to playback content via their own user device 105. In some scenarios the activation input can be made by a first user on behalf of a second user. This could be the case if the first user is close enough to touch the console device 103 but the second user is not.

At block 203 the method comprises using wireless communication to query one or more user devices 105 based on the activation input. The user devices 105 that are queried can be local user devices 105. The user devices 105 can be close enough to the console device 103 to enable low power wireless communication.

In some examples the type of query that is made can be dependent upon the activation input that was made. In some examples the user devices 105 that are queried can be dependent upon the activation input that was made.

The query can be made regarding providing content to the one or more user devices 105. For example, the query can query which of the user device 105 content is to be provided to.

At block 205 the method comprises collecting one or more responses to the query. The response can be collect via wireless communication signals from respective user device 105 and/or via user inputs of the user interface 111 and/or by any other suitable means.

The console device 103 can be configured to detect collect different types of responses to the query from different user devices 105. For instance, the console device 103 can be configured to detect a first type of response for user devices 105 used by users positioned so that the user can touch the user interface 111 and can be configured to detect a second type of response from user devices 105 used by users positioned so that the user cannot touch the user interface 111. The first type of response can comprise physical contact with the user interface 111 controlled by the apparatus. The second type of response can comprise a gesture input. The gesture input can comprise a tap input, a voice input, movement of a user's head, movement of a user's hand, and/or any other gesture or combinations of gestures. The gesture input can be detected by the input sensors 117 of the user device 105 and transmitted from the user device 105 to console device 103.

At block 207 the method comprises enabling content to be provided via a wireless communication link to the one or more user devices 105 based on the collected one or more responses. The content that is provided can comprise any suitable type of content. The content that is provided may be dependent upon the type of output module that the user device 105 comprises. In some examples the content can comprise audio content and/or visual content.

In some examples the console device 103 can be configured to use the collected one or more responses to the query to identify a user device 105 associated with the activation input. The content can then be provided to the user device 105 associated with the activation input. A user device 105 can be associated with the activation input by being associated with the user that made the activation input, or by being associated with a user who had the activation input made on their behalf.

The console device 103 can be configured to identify a positive response to the query. The positive response can be an indication that the user of the user device 105 associated with the response would like content to be provided to that user device 105. In response to this the console device 103 will enable the relevant content to the provided to the user device 105. The content could be audio content, visual content or any other suitable type of content. In some examples the content could be a menu or other arrangement that enables a user to select further content via their user device 105.

The console device 103 can also be configured to detect negative responses. If a negative response is detected the console device 103 does not provide content to the user device 105 associated with the negative response. In some example a negative response could comprise a wireless communication signal and/or a user input via the user interface 111. In some examples a negative response could be no input response being detected within a given time period.

In some examples the user devices 105 can be configured so that they provide a response to the query automatically. For instance, if the activation input was made by a user who can touch the console device 103, this input could also be detected by the input sensors of the user device 105 associated with that user. For instance, a user tapping the user interface 111 could be detected by an IMU of headphones or a smart watch being worn by the user. To enable the response to the queries to be made automatically, without any further user input, the queries from the console device 103 can comprise information relating to the timing of the activation input. The user devices 105 can then use this information to identify if the activation input corresponds to an input that has been detected by the user device 105. If there is a correlation between the respective detected inputs then a positive response to the query can be made without any further input from the user.

In some examples the user devices 105 can be configured so that the response to the query is made in response to an input detected by the input sensors 117 of the user device. This could be used in scenarios where the user has not made the activation input and so the user device 105 does not have information relating to the timing of the activation input.

Figure 3:
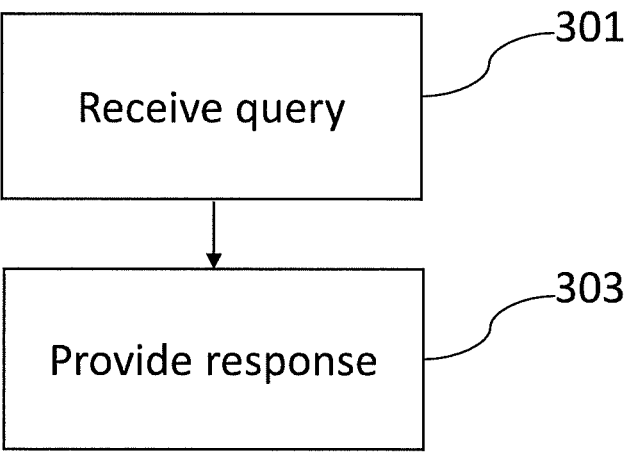
FIG. 3 shows an example method.

FIG. 3 shows an example method. The method could be implemented by an apparatus 113 of a user device 105 or by any other suitable apparatus or device. The user device 105 could comprise a head set, headphones, a mobile phone, a tablet device, a portable computer, a wearable electronics device or any other suitable type of device. The user device 105 could be a mobile device so that its position relative to the console device 103 could change.

The user device 105 can be associated with a user. For example, the user device 105 could be worn by a user or could be in use by a user or could belong to a user or could be associated in any other suitable way.

The method comprises, at block 301, receiving a query via wireless communication. The query is received from a console device 103. The console device 103 can be local to the user device 105. The query is sent in response to an activation input that has been detected by the console device 103.

In some examples the type of query that is made can be dependent upon the activation input that was made. In some examples the user devices 105 that are queried can be dependent upon the activation input that was made.

The query can be made regarding providing content to the one or more user devices 105. For example, the query can enquire which of the user device 105 content is to be provided to.

At block 303 the method comprises providing a response indicating whether the apparatus is associated with the activation input. The response can be provided in response to a user input detected by the user device 105 or could be provided automatically without any further specific user input.

In some examples the user device 105 can be configured to enable an output to be provided to the user of the user device 105. The output can be indicative of the query. For instance, the output can indicate that an activation input has been made or could ask the user if they want content to be provided to their user device 105.

In such examples the user device 105 can be also be configured to detect a user input responding to the output indicative of the query. The user input can indicate if the user is associated with the activation input or if the user wishes content to be provided to their user device 105. The input sensors 117 can be configured to detect a first user input indicating that the user is associated with the activation input and a second user input indicating that the user is not associated with the activation input. As an example, a single tap input could be an indication that the user is associated with the activation input and a double tap input could be an indication that the user is not associated with the activation input.

Different types of user device 105 can detect different user inputs depending on the type of input sensors 117 comprised in the user device 105. In some examples the user input can comprise a gesture input. The gesture input could comprise a tap input, a voice input, movement of a user's head, movement of a user's hand, and/or any other gesture or combinations of gestures.

Figure 4:
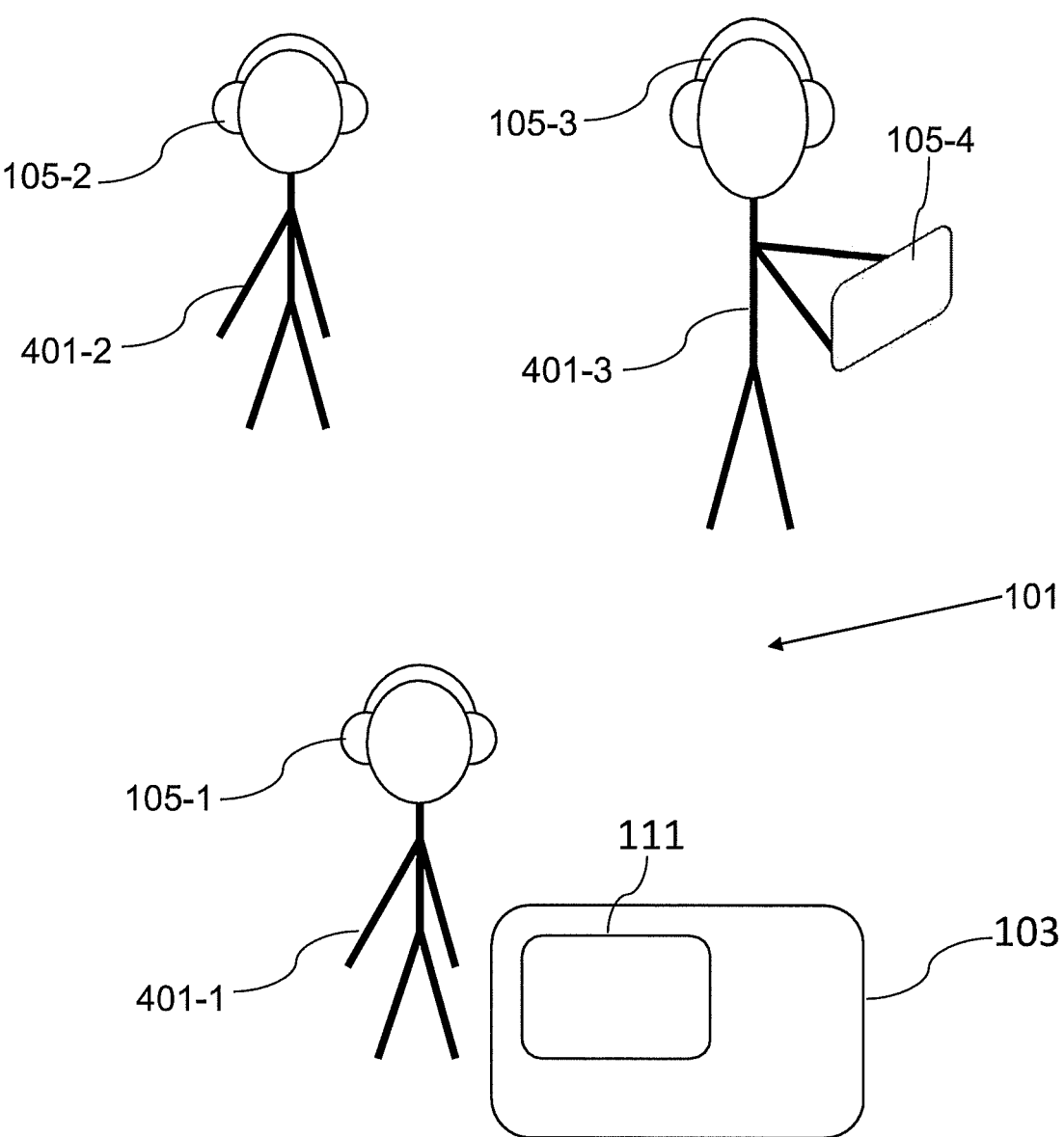
FIG. 4 shows an example system in use.

FIG. 4 schematically shows an example system 101 in use. The system comprises a console device 103 and a plurality of user devices 105. The user devices 105 are associated with respective users 401. The users 401 are located at different distances from the console device 103.

In the example of FIG. 4 three users 401 are shown around the console device 103.

Other numbers of user's could be located around the console device 103 in other examples. The console device 103 can be configured to transmit content to the respective user devices 105 that are located around the console device 103.

The users 401 and the console device 103 could be located in any suitable location.

In some examples the console device 103 and users 401 could be located within a vehicle such as a car. In such cases the console 103 could be located within the dashboard of the vehicle. This could enable a user 401 who is in a front seat of the vehicle to be close enough to the console device 103 to touch the console device 103 while a user 401 who is in a rear seat would not be close enough to touch the console device 103.

Other locations and/or types of console devices 103 could be used in other examples. For instance, the console could be located in a public location such as a vehicle used for public transport or a shop or other type of outlet.

In the example of FIG. 4 a first user 401-1 is positioned close enough to the console device 103 to enable the user 401-1 to touch the console device 401-1. This can enable the first user 401-1 to make inputs to the console device 103 by physically touching the user interface 111 of the console device 103.

The first user 401-1 also has a user device 105-1. In this example the user device 105-1 comprises headphones. The headphones can be configured to playback audio content to the first user 401-1.

If the first user 401-1 wants to control the content that is being played back via their user device 105-1 they can make an activation input via the user interface 111 of the console device 103. The user interface 111 could comprise a touch screen or any other suitable type of user input means. The respective users 401 might want to control the content being played back by selecting to start playing back content, by selecting a type of content, by selecting skip sections of content, and/or to control the content in any other suitable way.

When the console device 103 detects the activation input the console device 103 will query the user devices 105 to identify the user 401 or user device 105 associated with the activation input. The query can be sent to all user devices 105 that are located close to the console device 103. The query can be sent to user device 105 that have established a communication session with the console device 103. For instance, the console device 103 can have scanned for local user devices 105 and established a wireless communication connection with one or more of the local user devices 105.

The query that is sent by the console device 103 can comprise timing information relating to the time at which the activation input was made.

The activation input that is made can also be detected by the first user device 105-1. In this case the first user device 105-1 could comprise an IMU or any other suitable input sensors 117 that can also detect when the user makes an input on the user interface 111 of the console device 103. For instance, the tapping on the console device 103 would cause vibrations that could be detected by an IMU in the headphones being worn by the first user 105-1.

When the first user-device 105-1 detects the query from the console device 105 the first user device 105-1 can compare the timing of the activation input as indicated by the console device 103 and the timing of any inputs that have been detected by the first user device 105-1. If there is a correlation then the first user-device 105-1 will respond to the query indicating that they would like to control the content being provided to the user device 105-1.

When the console device 103 receives the response to the query it can enable content to be transmitted to the first user device 105-1. In some cases the console device 103 could be configured to enable the first user to make further inputs relating to the content by making inputs on the user interface 111. The further inputs would be linked to the first user device 105-1 to enable control of the content being provided to the first user device 105-1.

In the example of FIG. 4 a second user 401-2 is positioned further away from the console device 103. The second user 401-2 can be close enough to the console device 103 so that a wireless communication link can be established between the console device 103 and the second user device 105-1 but too far away from the console device 103 to enable the second user 401-2 to physically touch the console device 103. This means that second user 401-2 cannot make inputs to the console device 103 by physically touching the user interface 111 of the console device 103. In some examples the second user 401-2 could be located in the rear of a vehicle or could be in any other suitable location.

In the example of FIG. 4 the user device 105-2 associated with the second user 401-2 comprises headphones. The headphones can be configured to playback audio content to the second first user 401-2.

If the second user 401-2 wants to control the content that is being played back via their user device 105-2 they are unable to make an activation input via the user interface 111 of the console device 103. Therefore the second user 401-2 would request that a user 401 located close to the console device 103 makes the activation input on their behalf. For instance, in the example of FIG. 4, the second user 401-2 could request that the first user 401-1 makes the activation input on their behalf.

When the console device 103 detects the activation input the console device 103 will query the user devices 105 to identify the user 401 or user device 105 associated with the activation input.

When the user device 105-2 receives the query the user device 105-2 can provide an audio output questioning if the user was associated with the activation input. For instance an audio output asking "did you request an input" or other similar question could be played back over the headphones.

The user device 105-2 can be configured to detect a response from the second user 401-2 confirming whether or not they were associated with the activation input. For instance, the second user 401-2 could make a tap input that can be detected by an IMU, or other appropriate sensor of the user device 105-2. The tap input could be made by tapping part of the user device 105-2 or by tapping any other nearby surface, such as a window or table, so that it can be detected by the input sensors 117.

In some examples the second user 401-2 could make a first user input to indicate that they are associated with an activation input and a second, different user input to indicate that they are not associated with an activation input. For instance, they could make a single tap to indicate yes or a double tap to indicate no.

When the user device 105-2 detects the input from the user 401-2 it can then transmit an appropriate response to the query back to the console device 103. The response can indicate whether or not the user 401-2 has confirmed they were associated with the activation input.

When the console device 103 receives a positive the response to the query it can enable content to be transmitted to the second user device 105-2. In some cases, the console device 103 could be configured to enable the second user 401-2 to make further inputs relating to the content. For instance, menu items relating to the content could be provided as audio outputs to the second user 401-2. The second user 401-2 can respond to the menu items by making appropriate further user inputs. The further user inputs could be made using gesture inputs detected by the input sensors 117 of the user device 105-2.

In the example of FIG. 4 a third user 401-3 is also positioned close enough to the console device 103 so that a wireless communication link can be established between the console device 103 and the user devices 105-3, 105-3 of the third user 401-3 but too far away from the console device 103 to enable the third user 401-3 to physically touch the console device 103. This means that third user 401-3 cannot make inputs to the console device 103 by physically touching the user interface 111 of the console device 103. In some examples the third user 401-3 could be located in the rear of a vehicle or could be in any other suitable location.

In the example of FIG. 4 there are two user devices 105-3, 105-4 associated with the third user 401-3. In this case one of the user devices 105-3 comprises headphones and the other user device 105-4 comprises a mobile phone. This can enable audio content to be played back via the head phones and visual content to be played back via the mobile phone.

If the third user 401-3 wants to control the content that is being played back via the user devices 105-3, 105-4 they are unable to make an activation input via the user interface 111 of the console device 103. Therefore, the third user 401-3 would request that a user 401 located close to the console device 103 makes the activation input on their behalf. For instance, in the example of FIG. 4, the third user 401-3 could request that the first user 401-1 makes the activation input on their behalf.

When the console device 103 detects the activation input the console device 103 will query the user devices 105 to identify the user 401 or user device 105 associated with the activation input.

In the example of FIG. 4 the query could be received by the mobile phone 105-4. In response to the query the mobile phone 105-4 can provide an output questioning if the user was associated with the activation input. This could be a graphical query on a touch screen of the mobile phone 105-4 or could be provided via any other suitable means.

The mobile phone 105-4 can be configured to detect a response from the third user 401-3 confirming whether or not they were associated with the activation input. The user input could be detected via a touch screen and/or by any other suitable means.

When the user device 105-4 detects the input from the third user 401-3 it can then transmit an appropriate response to the query back to the console device 103. The response can indicate whether or not the third user 401-3 has confirmed they were associated with the activation input.

When the console device 103 receives a positive the response to the query it can enable content to be transmitted to one or both of the user devices 105-3, 105-4 associated with the third user 401-3. In some cases, the console device 103 could be configured to enable the third user 401-3 to make further inputs relating to the content.

These inputs could be made via a user interface of the mobile phone 105-4 or by any other suitable means.

Examples of the disclosure therefore provides methods and systems that enable content to be provided from a central console device 103 to one or more local user device 105. By sending a query in response to an activation input the console device 103 can identify which user devices 105 are to be provided with the content.

FIG. 5 schematically illustrates an apparatus 107/113 that can be used to implement examples of the disclosure. In this example the apparatus 107/113 comprises a controller 501. The controller 501 can be a chip or a chip-set. In some examples the controller 501 can be provided within a console device 103 or a user device 105 or any other suitable type of device.

In the example of FIG. 5 the implementation of the controller 501 can be as controller circuitry. In some examples the controller 501 can be implemented in hardware alone, have certain aspects in software including firmware alone or can be a combination of hardware and software (including firmware).

As illustrated in FIG. 5 the controller 501 can be implemented using instructions that enable hardware functionality, for example, by using executable instructions of a computer program 507 in a general-purpose or special-purpose processor 503 that may be stored on a computer readable storage medium (disk, memory etc.) to be executed by such a processor 503.

The processor 503 is configured to read from and write to the memory 505. The processor 503 can also comprise an output interface via which data and/or commands are output by the processor 503 and an input interface via which data and/or commands are input to the processor 503.

The memory 505 stores a computer program 507 comprising computer program instructions (computer program code) that controls the operation of the controller 501 when loaded into the processor 503. The computer program instructions, of the computer program 507, provide the logic and routines that enables the controller 501. to perform the methods illustrated in the accompanying FIGS. The processor 503 by reading the memory 505 is able to load and execute the computer program 507.

When the apparatus 107 is configured for use in a console device 103 the apparatus 107 comprises: at least one processor 503; and at least one memory 505 storing instructions that, when executed by the at least one processor, cause the apparatus at least to perform: detecting 201 an activation input wherein the activation input comprises physical contact with a user interface 111 controlled by the apparatus 107; using wireless communication to query 203 one or more user devices regarding providing content to the one or more user devices 105, based on the activation input; collecting 205 one or more responses to the query; and enabling content to be provided 207 via a wireless communication link to the one or more user devices 105 based on the collected one or more responses.

When the apparatus 113 is configured for use in a user device 105 the apparatus 113 comprises: at least one processor 503; and at least one memory 505 storing instructions that, when executed by the at least one processor, cause the apparatus at least to perform: receiving 301 a query via wireless communication wherein the query is received from a console device 103 and the query relates to providing content to one or more user devices 105, based on an activation input that has been detected by the console device 103; and providing a response indicating whether the apparatus 113 is associated with the activation input.

As illustrated in FIG. 5, the computer program 507 can arrive at the controller 501 via any suitable delivery mechanism 511. The delivery mechanism 511 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 507. The delivery mechanism can be a signal configured to reliably transfer the computer program 507. The controller 501 can propagate or transmit the computer program 507 as a computer data signal. In some examples the computer program 507 can be transmitted to the controller 501 using a wireless protocol such as Bluetooth, Bluetooth Low Energy, Bluetooth Smart, 6LoWPan (IP$_\nu$6 over low power personal area networks) ZigBee, ANT+, near field communication (NFC), Radio frequency identification, wireless local area network (wireless LAN) or any other suitable protocol.

When the computer program 507 is configured for use in a console device 103 the computer program 507 comprises computer program instructions for causing an apparatus 107 to perform at least the following or for performing at least the following: detecting 201 an activation input wherein the activation input comprises physical contact with a user interface 111 controlled by the apparatus 107; using wireless communication to query 203 one or more user devices regarding providing content to the one or more user devices 105, based on the activation input; collecting 205 one or more responses to the query; and enabling content to be provided 207 via a wireless communication link to the one or more user devices 105 based on the collected one or more responses.

When the computer program 507 is configured for use in a user device 105 the computer program 507 comprises computer program instructions for causing an apparatus 113 to perform at least the following or for performing at least the following: receiving 301 a query via wireless communication wherein the query is received from a console device 103 and the query relates to providing content to one or more user devices 105, based on an activation input that has been detected by the console device 103; and providing a response indicating whether the apparatus 113 is associated with the activation input.

The computer program instructions can be comprised in a computer program 507, a non-transitory computer readable medium, a computer program product, a machine-readable medium. In some but not necessarily all examples, the computer program instructions can be distributed over more than one computer program 507.

Although the memory 505 is illustrated as a single component/circuitry it can be implemented as one or more separate components/circuitry some or all of which can be integrated/removable and/or can provide permanent/semi-permanent/dynamic/cached storage.

Although the processor 503 is illustrated as a single component/circuitry it can be implemented as one or more separate components/circuitry some or all of which can be integrated/removable. The processor 503 can be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory or memories that work together to cause an apparatus, such as a mobile phone or server, to perform various functions and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIGS. 2 and 3 can represent steps in a method and/or sections of code in the computer program 507. The illustration of a particular order to the blocks does not necessarily imply that there is a required or preferred order for the blocks and the order and arrangement of the blocks can be varied. Furthermore, it can be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus, comprising:
at least one processor; and
at least one non-transitory memory storing instructions that, when executed with the at least one processor, cause the apparatus to perform:
detecting an activation input wherein the activation input comprises physical contact with a user interface controlled by the apparatus;
using wireless communication to query one or more user devices regarding providing content to the one or more user devices, based on the activation input;
collecting one or more responses to the query;
enabling content to be provided with a wireless communication link to the one or more user devices based on the collected one or more responses; and
detecting a first type of response, comprising physical contact with the user interface controlled by the apparatus, for user devices used by users positioned so that the user can touch the user interface controlled by the apparatus and detecting a second type of response from user devices used by users positioned so that the user cannot touch the user interface controlled by the apparatus.

2. The apparatus as claimed in claim 1 wherein the second type of response comprises a gesture input.

3. The apparatus as claimed in claim 2 wherein the gesture input comprises at least one of: a tap input, a voice input, movement of a user's head, or movement of a user's hand.

4. The apparatus as claimed in claim 1 wherein querying the one or more user devices comprises the instructions, when executed with the at least one processor, cause the apparatus to perform transmitting a signal indicating a timing of the activation input.

5. The apparatus as claimed in claim 1 wherein the means are for instructions, when executed with the at least one processor, cause the apparatus to perform using the collected one or more responses to identify a user device associated with the activation input and wherein the content is provided to the user device associated with the activation input.

6. The apparatus as claimed in claim 1 wherein the content comprises at least one of: audio content or visual content.

7. A console device comprising an apparatus as claimed in claim 1.

8. A method, comprising:

detecting an activation input wherein the activation input comprises physical contact with a user interface controlled by the apparatus;

using wireless communication to query one or more user devices regarding providing content to the one or more user devices, based on the activation input;

collecting one or more responses to the query;

enabling content to be provided with a wireless communication link to the one or more user devices based on the collected one or more responses; and detecting a first type of response, comprising physical contact with the user interface controlled by the apparatus, for user devices used by users positioned so that the user can touch the user interface controlled by the apparatus and detecting a second type of response from user devices used by users positioned so that the user cannot touch the user interface controlled by the apparatus.

9. A non-transitory computer-readable medium storing instructions that, when executed by one or more processors of an apparatus, cause the apparatus to perform at least:

detecting an activation input wherein the activation input comprises physical contact with a user interface controlled by the apparatus;

using wireless communication to query one or more user devices regarding providing content to the one or more user devices, based on the activation input;

collecting one or more responses to the query;

enabling content to be provided with a wireless communication link to the one or more user devices based on the collected one or more responses; and detecting a first type of response, comprising physical contact with the user interface controlled by the apparatus, for user devices used by users positioned so that the user can touch the user interface controlled by the apparatus and detecting a second type of response from user devices used by users positioned so that the user cannot touch the user interface controlled by the apparatus.

10. An apparatus, comprising:

at least one processor; and at least one non-transitory memory storing instructions that, when executed with the at least one processor, cause the apparatus to perform:

receiving a query with wireless communication wherein the query is received from a console device and the query relates to providing content to one or more user devices, based on an activation input that has been detected with the console device; and

providing a first type of response indicating whether the apparatus is associated with the activation input, wherein the first type of response comprises physical contact with the user interface controlled by the apparatus, for user devices used by users positioned so that the user can touch the user interface controlled by the apparatus and detecting a second type of response from user devices used by users positioned so that the user cannot touch the user interface controlled by the apparatus.

11. An apparatus as claimed in claim 10 wherein the instructions, when executed with the at least one processor, cause the apparatus to perform enabling an output to be provided to a user wherein the output is indicative of the query.

12. A method, comprising:

receiving a query with wireless communication wherein the query is received from a console device and the query relates to providing content to one or more user devices, based on an activation input that has been detected with the console device; and providing a first type of response indicating whether the apparatus is associated with the activation input, wherein the first type of response comprises physical contact with the user interface controlled by the apparatus, for user devices used by users positioned so that the user can touch the user interface controlled by the apparatus and detecting a second type of response from user devices used by users positioned so that the user cannot touch the user interface controlled by the apparatus.

13. A non-transitory computer-readable medium storing instructions that, when executed by one or more processors of an apparatus, cause the apparatus to perform at least for performing the method of claim 12:

receiving a query with wireless communication wherein the query is received from a console device and the query relates to providing content to one or more user devices, based on an activation input that has been detected by the console device; and providing a response indicating whether the apparatus is associated with the activation input, wherein the first type of response comprises physical contact with the user interface controlled by the apparatus, for user devices used by users positioned so that the user can touch the user interface controlled by the apparatus and detecting a second type of response from user devices used by users positioned so that the user cannot touch the user interface controlled by the apparatus.

* * * * *